United States Patent
Kim et al.

(10) Patent No.: US 12,040,535 B2
(45) Date of Patent: Jul. 16, 2024

(54) ANTENNA-INSERTED ELECTRODE STRUCTURE AND IMAGE DISPLAY DEVICE INCLUDING THE SAME

(71) Applicant: DONGWOO FINE-CHEM CO., LTD., Jeollabuk-do (KR)

(72) Inventors: Byuong In Kim, Seoul (KR); Chang Jun Maeng, Gyeonggi-do (KR); Yoon Ho Huh, Seoul (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 11 days.

(21) Appl. No.: 17/887,585

(22) Filed: Aug. 15, 2022

(65) Prior Publication Data

US 2022/0393338 A1    Dec. 8, 2022

Related U.S. Application Data

(63) Continuation of application No. PCT/KR2021/001641, filed on Feb. 8, 2021.

(30) Foreign Application Priority Data

Feb. 14, 2020  (KR) .......................... 10-2020-0018271

(51) Int. Cl.
  *H01Q 1/24*   (2006.01)
  *G06F 3/041*  (2006.01)
  *G06F 3/044*  (2006.01)

(52) U.S. Cl.
  CPC ........... *H01Q 1/243* (2013.01); *G06F 3/0412* (2013.01); *G06F 3/0443* (2019.05); *G06F 3/0446* (2019.05); *G06F 3/0448* (2019.05); *G06F 2203/04111* (2013.01); *G06F 2203/04112* (2013.01)

(58) Field of Classification Search
  CPC ......... G06F 1/1698; G06F 2203/04111; G06F 2203/04112; G06F 3/0443; G06F 3/0445;
  (Continued)

(56) References Cited

U.S. PATENT DOCUMENTS

2010/0033709 A1    2/2010  Lampin et al.
2013/0181937 A1    7/2013  Chen et al.
(Continued)

FOREIGN PATENT DOCUMENTS

KR    10-2013-0095451 A    8/2013
KR    10-2096417 B1    4/2020
(Continued)

OTHER PUBLICATIONS

International Search Report for PCT/KR2021/001641 mailed on Jun. 3, 2021.
(Continued)

*Primary Examiner* — Nitin Patel
*Assistant Examiner* — Amen W Bogale
(74) *Attorney, Agent, or Firm* — The PL Law Group, PLLC (57) ABSTRACT

An antenna-inserted electrode structure according to an embodiment includes a substrate layer including a touch sensing area and a touch sensing-antenna area, sensing electrodes disposed on the touch sensing area and the touch sensing-antenna area of the substrate layer, and an antenna unit disposed on the touch sensing-antenna area of the substrate layer, the antenna unit including a radiator inclined to an arrangement direction of the sensing electrodes. An image display device including the antenna-inserted electrode structure from which a moire phenomenon is suppressed is provided.

11 Claims, 5 Drawing Sheets

(58) Field of Classification Search
CPC ...... G06F 3/041; G06F 3/0412; G06F 3/0446; G06F 3/0448; G06F 3/04164; G06F 3/047; H01Q 21/08; H01Q 21/065; H01Q 21/061; H01Q 9/04; H01Q 9/0407; H01Q 9/045; H01Q 5/307; H01Q 1/2266; H01Q 1/44; H01Q 1/36; H01Q 1/38; H01Q 1/52; H01Q 1/243
See application file for complete search history.

(56) References Cited

U.S. PATENT DOCUMENTS

| | | |
|---|---|---|
| 2014/0176819 A1 | 6/2014 | Yilmaz |
| 2016/0328057 A1 | 11/2016 | Chai et al. |
| 2021/0103354 A1* | 4/2021 | Kim ...................... G06F 3/0416 |
| 2021/0200379 A1* | 7/2021 | Youk ..................... G06F 3/0412 |

FOREIGN PATENT DOCUMENTS

| | | |
|---|---|---|
| WO | WO 2010/099132 A2 | 9/2010 |
| WO | WO 2013/063176 A1 | 5/2013 |

OTHER PUBLICATIONS

Sharma, Sameer Kumar et al., "On the Integration of Antennas With Touch Sensor Panels", 2019 IEEE International Symposium on Antennas and Propagation and USNC-URSI Radio Science Meeting, pp. 707-708, 2019, DOI: http://dx.doi.org/10.1109/APUSNCURSINRSM.2019.8888787.

* cited by examiner

ANTENNA-INSERTED ELECTRODE STRUCTURE AND IMAGE DISPLAY DEVICE INCLUDING THE SAME

PRIORITY

The present application is a continuation application to International Application No. PCT/KR2021/001641 with an International Filing Date of Feb. 8, 2021, which claims the benefit of Korean Patent Applications No. 10-2020-0018271 filed on Feb. 14, 2020 at the Korean Intellectual Property Office, the disclosures of which are incorporated by reference herein in their entirety.

BACKGROUND

1. Field

The present invention relates to an antenna-inserted electrode structure and a display device including the same. More particularly, the present invention relates to an antenna-inserted electrode structure including an antenna unit and a sensing electrode and a display device including the same.

2. Description of the Related Art

Recently, electronic devices capable of inputting a user's direction by selecting an instruction displayed on an image display device with a human hand or an object are implemented by a combination of the image display device and a touch sensor as various shapes such as a smart phones, a tablet PC, etc.

Further, the image display device is being combined with a communication device such as a smart phone. For example, an antenna for implementing high-frequency or ultra-high frequency communication in 3G to 5G or higher bands may be applied to the image display device.

As described above, when the touch sensor and the antenna are applied to one image display device, a design construction for inserting a plurality of electrodes in a limited space is required. For example, if touch sensing electrodes and a radiation electrode of the antenna are formed together, the radiation electrode in a desired shape for achieving a predetermined radiation property may not be easily formed.

Further, when the touch sensing electrodes overlap a pixel structure of the image display device, an image quality of the image display device may be degraded due to an optical phenomenon such as a moire phenomenon.

For example, as disclosed in Korean Published Patent Application No. 2014-0092366, a touch screen panel in which a touch sensor is combined with various image display devices has been recently developed. Korean Patent Publication No. 2013-0095451 discloses an antenna integrated into a display panel.

SUMMARY

According to an aspect of the present invention, there is provided an antenna-integrated electrode structure having improved radiation property and spatial efficiency.

According to an aspect of the present invention, there is provided an image display device including an antenna-integrated electrode structure with improved radiation property and spatial efficiency.

The above aspects of the present invention will be achieved by one or more of the following features or constructions:

(1) An antenna-inserted electrode structure, including: a substrate layer comprising a touch sensing area and a touch sensing-antenna area; sensing electrodes disposed on the touch sensing area and the touch sensing-antenna area of the substrate layer; and an antenna unit disposed on the touch sensing-antenna area of the substrate layer, the antenna unit comprising a radiator inclined with respect to an arrangement direction of the sensing electrodes.

(2) The antenna-inserted electrode structure according to the above (1), wherein the sensing electrodes includes first sensing electrodes arranged in a first direction parallel to a top surface of the substrate; and second sensing electrodes arranged in a second direction parallel to the top surface of the substrate layer and perpendicular to the first direction.

(3) The antenna-inserted electrode structure according to the above (2), wherein the sensing electrodes and the radiator include a mesh structure that includes first electrode lines and second electrode lines intersecting each other, and the mesh structure includes unit cells defined by the first electrode lines and the second electrode lines crossing each other.

(4) The antenna-inserted electrode structure according to the above (3), wherein each of the unit cells has a polygonal shape, and a diagonal line of each of the unit cells is inclined with respect to the first direction and the second direction.

(5) The antenna-inserted electrode structure according to the above (3), wherein a boundary of the radiator has a continuous linear shape extending along an extension direction of the first electrode lines or the second electrode lines.

(6) The antenna-inserted electrode structure according to the above (3), wherein boundaries of the sensing electrodes include protrusions formed by cutting the first electrode lines or the second electrode lines.

(7) The antenna-inserted electrode structure according to the above (3), wherein the antenna unit further includes a transmission line formed from the mesh structure and integrally connected to the radiator, and a signal pad connected to an end portion of the transmission line.

(8) The antenna-inserted electrode structure according to the above (7), wherein the transmission line extends obliquely with respect to the first direction and the second direction.

(9) The antenna-inserted electrode structure according to the above (2), further including connecting portions integrally connecting the first sensing electrodes along the first direction; and bridge electrodes electrically connecting the second sensing electrodes to each other along the second direction.

(10) The antenna-inserted electrode structure according to the above (1), wherein sensing electrodes arranged in the touch sensing area have a shape different from that of sensing electrodes adjacent to the radiator in the touch sensing-antenna area.

(11) The antenna-inserted electrode structure according to the above (10), wherein the sensing electrodes adjacent to the radiator have a shape in which the shape of the sensing electrodes arranged in the touch sensing area is cut or partially removed by the radiator.

(12) The antenna-inserted electrode structure according to the above (1), wherein the sensing electrodes and the antenna unit are located at the same layer or at the same level.

(13) An image display device, including: a display panel including a plurality of pixels; and the antenna-inserted electrode structure according to embodiments as described above stacked on the display panel.

(14) The image display device according to the above (13), wherein the sensing electrodes and the radiator include a mesh structure that includes a plurality of unit cells therein, and an arrangement direction of the plurality of unit cells is different from an arrangement direction of the plurality of pixels.

In an antenna-inserted electrode structure according to exemplary embodiments of the present invention, a radiator of an antenna unit may be formed at the same layer or at the same level as that of sensing electrodes of a touch sensor, and may be disposed between the sensing electrodes. Accordingly, the touch sensor and the antenna unit may be fabricated in a module without an additional a space for accommodating the antenna unit.

In exemplary embodiments, the sensing electrodes and the radiators may share the same mesh structure, and the mesh structure may have a cell arrangement inclined with respect to a pixel grid arrangement of a display panel. Accordingly, a moire phenomenon due to an overlap between the antenna-inserted electrode structure and pixels may be prevented.

In exemplary embodiments, the antenna unit may have a boundary extending in the same direction as that of electrode lines included in the mesh structure, and may have a substantially seamless boundary from which a protrusion or a tip portion generated when the electrode lines are cut may be substantially removed. Therefore, a radiator having desired frequency and directivity may be implemented with high reliability.

DETAILED DESCRIPTION OF THE EMBODIMENTS

According to exemplary embodiments of the present invention, there is provided an antenna-inserted electrode structure including an antenna unit and a sensing electrode in the same plane. Further, there is provided an image display device including the antenna-inserted electrode structure.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying, two directions that are parallel to atop surface of a substrate layer 100 and perpendicular to each other are referred to as a first direction and a second direction. For example, the first direction may correspond to a length direction of an antenna-inserted electrode structure or an image display device. The second direction may correspond to a width direction of the antenna-inserted electrode structure or the image display device.

Figure 1:
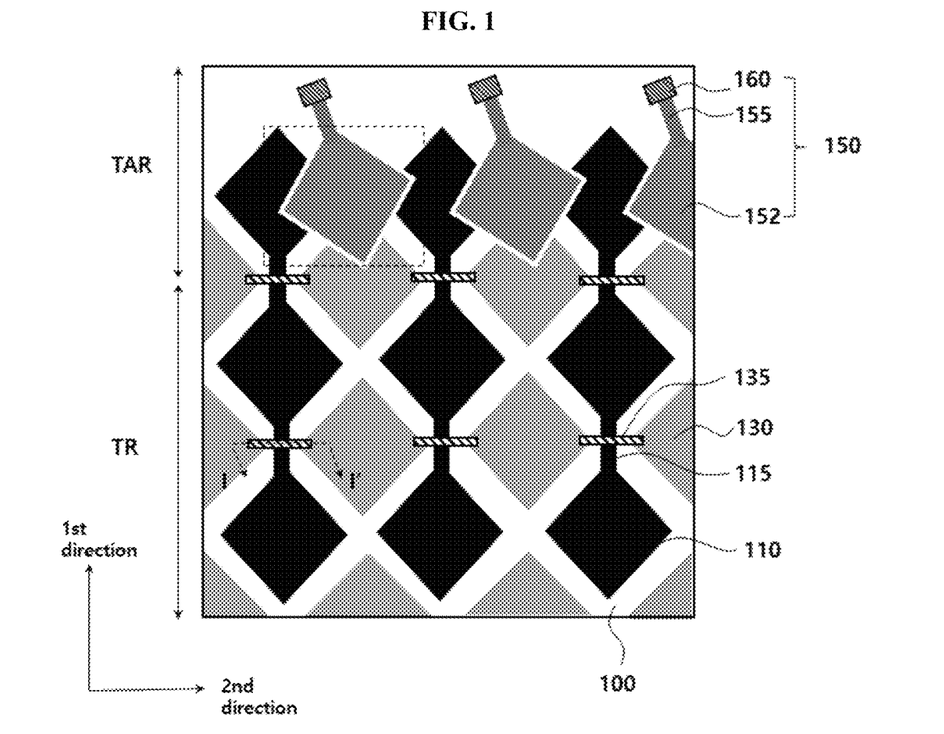
FIG. 1 is a schematic top planar view illustrating an antenna-inserted electrode structure in accordance with exemplary embodiments.
Figure 2:
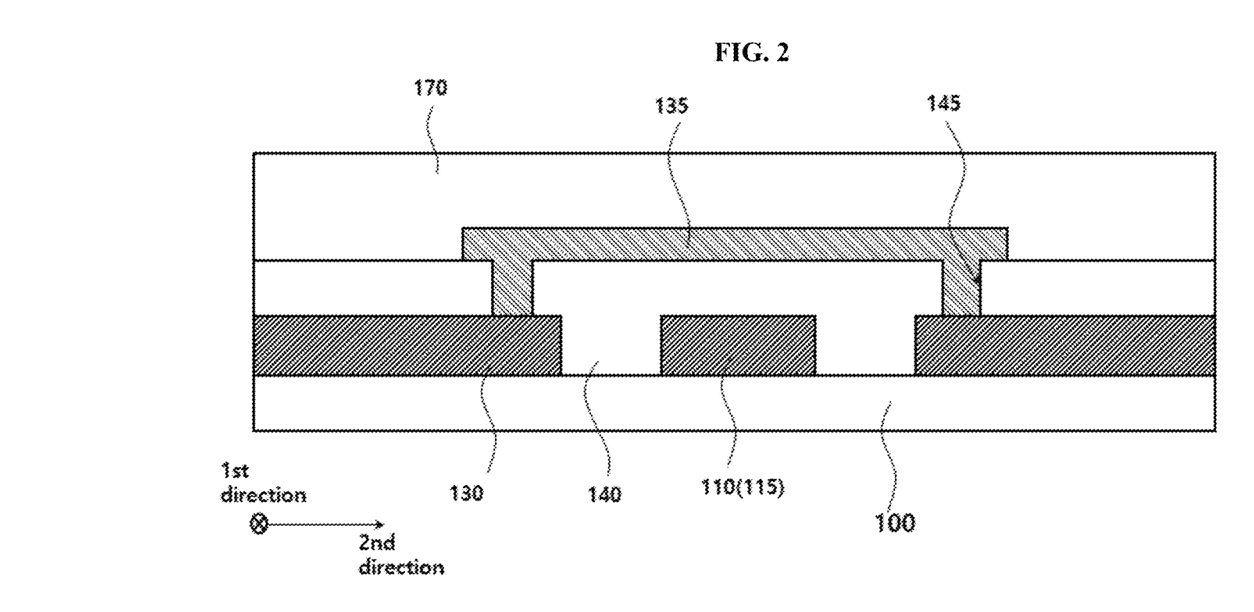
FIG. 2 is a schematic cross-sectional view illustrating a construction of sensing electrodes in an antenna-inserted electrode structure in accordance with exemplary embodiments.

FIG. 1 is a schematic top planar view illustrating an antenna-inserted electrode structure in accordance with exemplary embodiments. FIG. 2 is a schematic cross-sectional view illustrating a construction of sensing electrodes in an antenna-inserted electrode structure in accordance with exemplary embodiments. Specifically, FIG. 2 is a cross-sectional view taken along a line I-I' of FIG. 1 in a thickness direction.

In FIGS. 1 and 2, each electrode is illustrated as a solid pattern for convenience of describing an arrangement of the electrodes in the antenna-inserted electrode structure. However, as will be described later with reference to FIG. 3, each electrode may have a mesh structure.

Referring to FIGS. 1 and 2, the antenna-inserted electrode structure may include a substrate layer 100, and sensing electrodes 110 and 130 and an antenna unit 150 arranged on the substrate layer 100, The substrate layer 100 or the antenna-inserted electrode structure may include a touch sensing area TR and a touch sensing-antenna area TAR.

The touch sensing area TR may include a central portion of the substrate layer 100 and may substantially serve as an active area of a touch sensor through which a user's touch input is sensed.

The touch sensing-antenna area TAR may be an area in which the antenna unit 150 for implementing a high-frequency or ultra-high frequency communication (e.g., 3G, 4G, 5G communication or more) may be included. In exemplary embodiments, some of the sensing electrodes 110 and 130 of the touch sensor may be distributed together with the antenna unit 150 in the touch sensing-antenna area TAR.

As illustrated in FIG. 1, the touch sensing-antenna area TAR may be allocated to an end portion or a side portion of the substrate layer 100 to be adjacent to the touch sensing area TR.

First sensing electrodes 110 and second sensing electrodes 130 may be arranged on the touch sensing area TR and the touch sensing-antenna area TAR of the substrate layer 100. In exemplary embodiments, a touch sensing may be implemented by a mutual capacitance between the first and second sensing electrodes 110 and 130.

The substrate layer 100 may include a support layer or a film type substrate for forming the sensing electrodes 110 and 130 and the antenna unit 150. For example, the substrate layer 100 may include a film material commonly used for a touch sensor without particular limitation, and may include, e.g., glass, a polymer, and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride and a metal oxide.

In some embodiments, a layer or film member of an image display device to which the antenna-inserted electrode structure is applied may serve as the substrate layer 100. For example, an encapsulation layer or a passivation layer included in a display panel may serve as the substrate layer 100.

The substrate layer 100 may serve as a dielectric layer of the antenna unit 150. Preferably, a dielectric constant of the substrate layer 100 may be adjusted in a range from about 1.5 to 12. When the dielectric constant exceeds about 12, a driving frequency may be excessively decreased and an antenna driving in a desired high frequency or ultrahigh frequency band may not be implemented.

The first sensing electrodes 110 may be arranged along the first direction. The first sensing electrodes 110 neighboring each other in the first direction may be connected to each other by a connecting portion 115. The first sensing electrodes 110 and the connecting portion 115 may be integrally connected to each other to be substantially provided as a single member. In this case, the first sensing electrodes 110 and the connecting portion 115 may be formed by the same patterning process using the same conductive layer (e.g., a mesh structure), and may be located at the same layer or at the same level.

Accordingly, a first sensing electrode column extending in the first direction may be defined, and a plurality of the first sensing electrode columns may be arranged along the second direction.

The second sensing electrodes 130 may be arranged along the second direction. The second sensing electrodes 130 may each have an independent island pattern shape, and the second sensing electrodes 130 neighboring in the second direction may be electrically connected to each other by a bridge electrode 135.

Accordingly, a second sensing electrode row extending in the second direction may be defined, and a plurality of the second sensing electrode rows may be arranged along the first direction.

FIG. 1 illustrates an example that the second sensing electrode row includes the bridge electrode 135 and the first sensing electrode column includes the connecting portion. However, the first sensing electrode column may be defined by the bridge electrode, and the second sensing electrode row may be defined by the connecting portion.

The sensing electrodes 110 and 130 and/or the bridge electrode 135 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), tin (Sn), calcium (Ca) or an alloy containing at least one of the metals (e.g., silver-palladium-copper (APC)), or copper (Cu) or a copper alloy (e.g., a copper-calcium (CuCa)). These may be used alone or in combination thereof.

The sensing electrodes 110 and 130 and/or the bridge electrode 135 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 110 and 130 and/or the bridge electrode 135 may have a multi-layered structure including a metal or alloy layer, and a transparent metal oxide layer. For example, the sensing electrodes 110 and 130 and/or the bridge electrode 135 may include a double-layered structure of a transparent conductive oxide layer-metal layer or a triple-layered structure of a first transparent conductive oxide layer-metal layer-second transparent conductive oxide layer. In this case, flexible properties may be improved by the metal layer, and a resistance may also be reduced by the metal layer to increase a signal transmission speed. Anti-corrosive and transparent properties may be improved by the transparent conductive oxide layer.

As illustrated in FIG. 2, an insulating layer 140 may be formed on the substrate layer 100 to at least partially cover the sensing electrodes 110 and 130 and the connecting portion 115. The bridge electrode 135 may be disposed on the insulating layer 140 to electrically connect the neighboring second sensing electrodes 130 to each other through, e.g., a contact hole 145 formed in the insulating layer 140.

A passivation layer 170 for protecting the touch sensor may be formed on the insulating layer 140 and the bridge electrode 135.

The insulating layer 140 and the passivation layer 170 may include an inorganic insulating material such as silicon oxide or silicon nitride, and/or an organic insulating material such as an acrylic resin or a siloxane resin.

In some embodiments, the sensing electrodes 110 and 130 and the bridge electrode 135 may be arranged in a bottom-bridge structure. In this case, the bridge electrode 135 may be disposed under the sensing electrodes 110 and 130. For example, the bridge electrode 135 may include a low-resistance metal, and may be disposed to be away from a visible surface (e.g., a top surface of the passivation layer 170), so that a channel resistance and an electrode visual recognition by a light reflection may be reduced.

The sensing electrodes 110 and 130 and the antenna unit 150 may be arranged together on the touch sensing-antenna area TAR of the substrate layer 100. In exemplary embodiments, the sensing electrodes 110 and 130 and the antenna unit 150 may be located at the same layer or at the same level.

The antenna unit 150 may include a radiator 152, a transmission line 155 and a signal pad 160. A boundary of the radiator 152 may have a polygonal shape such as a rhombus shape or a diamond shape. The transmission line 155 may extend from one end of the radiator 152. The signal pad 160 may be electrically connected to an end portion of the transmission line 155.

The antenna unit 150 may include a conductive material substantially the same as or similar to that of the sensing electrodes 110 and 130. For example, the antenna unit 150 may include the above-described metal or alloy, or a transparent conductive oxide, and may have a multi-layered structure of a metal layer and a transparent conductive oxide.

As will be described later with reference to FIG. 3, the radiator 152 and the transmission line 155 may have a mesh structure including a plurality of electrode lines crossing each other therein. In an embodiment, the radiator 152 and the transmission line 155 may be formed as a substantially single member including the mesh structure.

The signal pad 160 may be formed as, e.g., a solid pattern including the above-described metal or alloy to reduce a feeding resistance. In an embodiment, a ground pad (not illustrated) may be further disposed around each signal pad 160. The signal pad 160 may be electrically connected to an antenna driving IC chip through a conductive intermediate structure such as, e.g., a flexible printed circuit board (FPCB) and an anisotropic conductive film (ACF).

As illustrated in FIG. 1, the radiator 152 may have a rectangular shape such as a rhombus shape, and all diagonal lines of the radiator 152 may be inclined with respect to the first and second directions. In some embodiments, the transmission line 155 may also be inclined with respect to the first direction and the second direction. For example, the transmission line 155 and a diagonal line of the radiator 152 extending from the transmission line 155 may be inclined in a range of about 5° to 30° with respect to the first direction.

The radiator 152 may have a shape inserted between the sensing electrodes 110 and 130 in the touch sensing-antenna area TAR. Accordingly, the sensing electrodes 110 and 130 adjacent to the radiator 152 may have a shape partially cut and removed by the radiator 152 from the shape of the sensing electrodes 110 and 130 in the touch sensing area TR.

As described above, the radiator 152 of the antenna unit 150 may be arranged on the same plane or at the same level as that of the sensing electrodes 110 and 130, and may be inserted between the sensing electrodes 110 and 130. Thus, the antenna unit 150 may be integrated with the touch sensor so that a touch sensing and an antenna radiation may be implemented together from one electrode layer.

Figure 3:
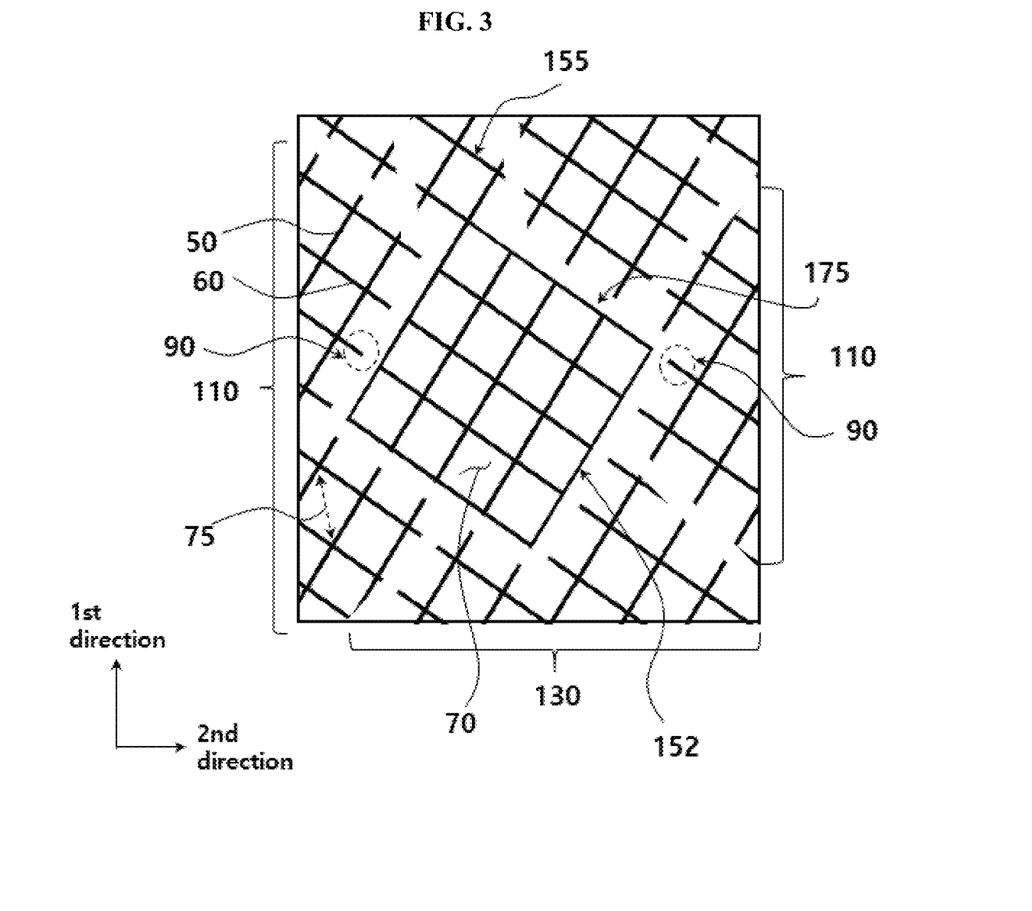
FIG. 3 is a partially enlarged top planar view illustrating a construction and an arrangement of an antenna unit and sensing electrodes in an antenna-inserted electrode structure in accordance with exemplary embodiments.

FIG. 3 is a partially enlarged top planar view illustrating a construction and an arrangement of an antenna unit and sensing electrodes in an antenna-inserted electrode structure in accordance with exemplary embodiments. For example, FIG. 3 illustrates a mesh structure included in the sensing electrodes 110 and 130 and the antenna unit 150 in a region indicated by a dotted rectangle in FIG. 1.

Referring to FIG. 3, the mesh structure may include first electrode lines 50 and second electrode lines 60 intersecting each other. The mesh structure may include unit cells 70 defined by intersecting first electrode lines 50 and second electrode lines 60 in a mesh or honeycomb shape.

In exemplary embodiments, the unit cell 70 included in the mesh structure may have a polygonal shape such as a quadrangle shape, and a diagonal line 75 of the unit cell 70 may be inclined with respect to the first direction and the second direction.

As described above, the first direction may correspond to the length direction of the antenna-inserted electrode structure or the image display device, and the second direction may correspond to the width direction of the antenna-inserted electrode structure or the image display device.

An orientation of the unit cell 70 may be inclined with respect to the length direction and the width direction, so that a moiré phenomenon due to and overlap of the sensing electrodes 110 and 130 and pixels 207 (see FIG. 4) of the image display device may be suppressed or reduced.

In exemplary embodiments, the sensing electrodes 110 and 130 and the antenna unit 150 may be formed by partially etching the mesh structure. For example, boundaries of the sensing electrodes 110 and 130 and the antenna unit 150 may be defined and separated by a separation region 175 formed by etching the mesh structure.

As described with reference to FIG. 1, the boundary of the radiator 152 may have a substantially rectangular profile such as a rhombus shape. In exemplary embodiments, each side of the radiator 152 may be defined by a single first electrode line 50 or a single second electrode line 60, and may extend substantially continuously.

For example, the boundary of the radiator 152 may not include a tip portion or a protrusion formed from the cut electrode lines 50 and 60 to protrude to an outside of the boundary, and the boundary of the radiator 152 may have a substantially seamless linear shape.

As described above, the boundary of the radiator 152 may be a portion of the first and second electrode lines 50 and 60 inclined with respect to the first and second directions, so that the tip portion or the protrusion may be removed.

Thus, radiation directivity and radiation reliability implemented from the radiator 152 may be enhanced, and a decrease in radiation efficiency due to the tip portion or the protrusion may be prevented.

The sensing electrodes 110 and 130 may be defined around the radiator 152 by the separation region 175. The boundaries of the sensing electrodes 110 and 130 may include protrusions 90 formed by cutting the electrode lines 50 and 60. The protrusion 90 may have, e.g., a prickle shape protruding from the boundary of the sensing electrodes 110 and 130.

The sensing electrodes 110 and 130 may include the protrusions 90, so that an area or a volume of a conductor may be increased, and a channel resistance through the sensing electrodes 110 and 130 may be decreased. Additionally, a random property may be provided to the arrangement of the sensing electrodes 110 and 130 by the protrusions 90, so that the moire phenomenon may be further reduced.

The separation region 175 may further extend from the boundary of the radiator 152 in a bent shape to define the transmission line 155 integrally connected to the radiator 152.

Figure 4:
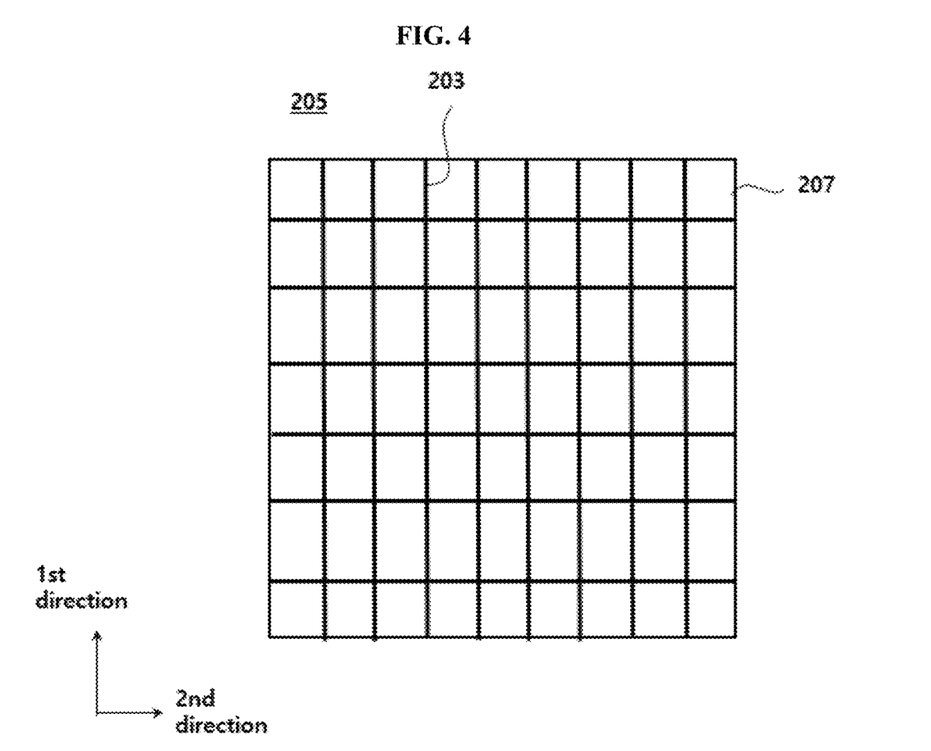
FIGS. 4 and 5 are schematic top planar views illustrating an image display device in accordance with exemplary embodiments.
Figure 5:
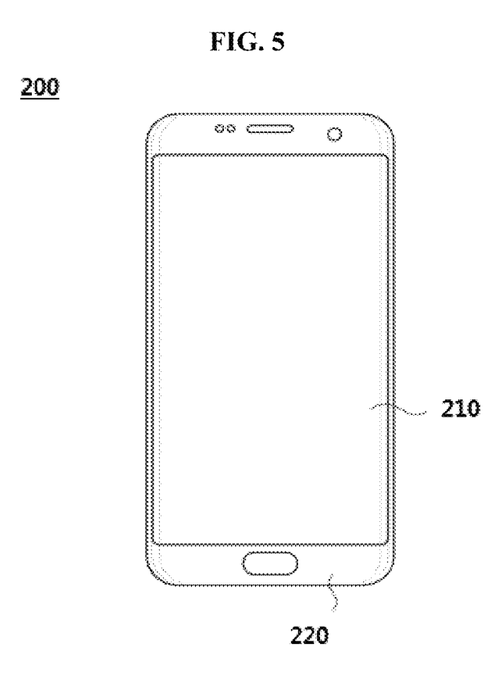

FIGS. 4 and 5 are schematic top planar views illustrating an image display device in accordance with exemplary embodiments. For example, FIG. 4 schematically illustrates a pixel structure of a display panel. FIG. 5 illustrates an outer shape including a window of the image display device.

Referring to FIG. 4, a display panel 205 may include a plurality of pixels 207 defined by a pixel defining layer 203.

Each pixel electrode and an RGB organic emission layer or a liquid crystal layer formed on the pixel electrode may be disposed in the pixels 207. The pixels 207 may be regularly arranged along the first direction and the second direction, and may each have a rectangular grid shape.

According to the above-described exemplary embodiments, the unit cell 70 included in the mesh structure may be disposed to be inclined with respect to each pixel 207 to prevent a regular overlap between the sensing electrodes 110 and 130 and the pixels 207 and the moire phenomenon resulting therefrom may be prevented.

The antenna-inserted electrode structure according to exemplary embodiments may be stacked on the display panel 205 to implement an image display device 200 to which a touch sensor and an antenna may be applied together.

Referring to FIG. 5, the image display device 200 may include a display area 210 and a peripheral area 220. For example, the peripheral area 220 may be disposed on both lateral portions and/or both end portions of the display area 210. The peripheral area 220 may correspond to, e.g., a light-shielding portion or a bezel portion of the image display device.

The above-described antenna-inserted electrode structure may be disposed over the display area 210 and the peripheral area 220 of the image display device 200, and the first and second sensing electrodes 110 and 130 of the touch sensing area TR may be arranged in the display area 210.

Further, the touch sensing-antenna area TAR may be located over the display area 210 and the peripheral area 220. For example, the radiator 152 of the antenna unit 150 and the sensing electrodes 110 and 130 around the radiator 152 may also be at least partially arranged in the display area 210. As described above, the radiators 152 and the sensing electrodes 110 and 130 may be prevented from being visually recognized to a user by using the mesh structure.

The signal pad 160 of the antenna unit 150 illustrated in FIG. 1 may be disposed in the peripheral area 220. A touch sensor driving IC chip and an antenna driving IC chip may also be disposed in the peripheral area 220 to be electrically connected to traces connected to the sensing electrodes 110 and 130, and the signal pad 160 of the antenna unit 150, respectively.

What is claimed is:

1. An antenna-inserted electrode structure, comprising:
   a substrate layer comprising a touch sensing area and a touch sensing-antenna area;
   sensing electrodes disposed on the touch sensing area and the touch sensing-antenna area of the substrate layer, the sensing electrodes comprising first sensing electrodes arranged in a first direction parallel to a top surface of the substrate and second sensing electrodes arranged in a second direction parallel to the top surface of the substrate layer, wherein the second direction is perpendicular to the first direction; and
   an antenna unit disposed on the touch sensing-antenna area of the substrate layer, the antenna unit comprising a radiator inclined with respect to an arrangement direction of the sensing electrodes,
   wherein the sensing electrodes and the radiator include a mesh structure that includes first electrode lines and second electrode lines intersecting each other, and the mesh structure includes unit cells defined by the first electrode lines and the second electrode lines crossing each other,
   wherein the antenna unit further comprises a transmission line formed from the mesh structure and integrally connected to the radiator, and a signal pad connected to an end portion of the transmission line.

2. The antenna-inserted electrode structure according to claim 1, wherein each of the unit cells has a polygonal shape, and a diagonal line of each of the unit cells is inclined with respect to the first direction and the second direction.

3. The antenna-inserted electrode structure according to claim 1, wherein a boundary of the radiator has a continuous linear shape extending along extension directions of the first electrode lines or the second electrode lines.

4. The antenna-inserted electrode structure according to claim 1, wherein boundaries of the sensing electrodes include protrusions formed by cutting the first electrode lines or the second electrode lines.

5. The antenna-inserted electrode structure according to claim 1, wherein the transmission line extends obliquely with respect to the first direction and the second direction.

6. The antenna-inserted electrode structure according to claim 1, further comprising:
   connecting portions integrally connecting the first sensing electrodes along the first direction; and
   bridge electrodes electrically connecting the second sensing electrodes to each other along the second direction.

7. The antenna-inserted electrode structure according to claim 1, wherein sensing electrodes arranged in the touch sensing area have a shape different from that of sensing electrodes adjacent to the radiator in the touch sensing-antenna area.

8. The antenna-inserted electrode structure according to claim 7, wherein the sensing electrodes adjacent to the radiator have a shape in which the shape of the sensing electrodes arranged in the touch sensing area is cut or partially removed by the radiator.

9. The antenna-inserted electrode structure according to claim 1, wherein the sensing electrodes and the antenna unit are located at the same layer or at the same level.

10. An image display device, comprising:
    a display panel comprising a plurality of pixels; and
    the antenna-inserted electrode structure according to claim 1 stacked on the display panel.

11. The image display device according to claim 10, wherein the sensing electrodes and the radiator comprise a mesh structure that includes a plurality of unit cells therein,
    wherein an arrangement direction of the plurality of unit cells is different from an arrangement direction of the plurality of pixels.

* * * * *